US008819846B2

(12) United States Patent
Li et al.

(10) Patent No.: US 8,819,846 B2
(45) Date of Patent: *Aug. 26, 2014

(54) MAKING SYSTEM CONSTRAINTS OF A SPECIFIED PERMISSION IN DIGITAL RIGHTS MANAGEMENT

(71) Applicant: Huawei Technologies Co., Ltd., Guangdong (CN)

(72) Inventors: Yimin Li, Shenzhen (CN); Pei Dang, Nanjing (CN)

(73) Assignee: Huawei Technologies Co., Ltd. (CN)

( * ) Notice: Subject to any disclaimer, the term of this patent is extended or adjusted under 35 U.S.C. 154(b) by 0 days.

This patent is subject to a terminal disclaimer.

(21) Appl. No.: 13/631,157

(22) Filed: Sep. 28, 2012

(65) Prior Publication Data

US 2013/0024945 A1 Jan. 24, 2013

Related U.S. Application Data

(63) Continuation of application No. 11/504,550, filed on Aug. 15, 2006, now Pat. No. 8,307,447.

(30) Foreign Application Priority Data

Aug. 15, 2005 (CN) .......................... 2005 1 0092506

(51) Int. Cl.
*H04L 29/06* (2006.01)
*G06F 21/00* (2013.01)
*G06F 7/04* (2006.01)
*H04L 9/00* (2006.01)
*G06F 21/10* (2013.01)
*H04N 7/24* (2011.01)
*H04N 7/15* (2006.01)

(52) U.S. Cl.
USPC ............... 726/27; 726/26; 713/158; 713/193; 705/57; 359/566; 380/230; 380/231

(58) Field of Classification Search
USPC ................ 726/26, 27; 713/158, 193; 705/57; 359/566; 380/230, 231
See application file for complete search history.

(56) References Cited

U.S. PATENT DOCUMENTS 5,968,175 A 10/1999 Morishita et al.
7,493,490 B2 2/2009 Tanner, Jr. et al.
(Continued)

FOREIGN PATENT DOCUMENTS

CN 1521980 A 8/2004
CN 1525363 A 9/2004
(Continued)

OTHER PUBLICATIONS

Sandro Etalle, William H. Winsborough; "Maintaining control while delegating trust: Integrity constraints in trust management"; Oct. 2009; Transactions on Information and System Security (TISSEC), vol. 13 Issue 1; Publisher: ACM; pp. 1-27.*

(Continued)

*Primary Examiner* — Andrew Nalven
*Assistant Examiner* — Courtney Fields
(74) *Attorney, Agent, or Firm* — Huawei Technologies Co., Ltd.

(57) ABSTRACT

A method and a terminal device for making multi-system constraint of a specified permission in a digital rights. A rights object related to content object is obtained by an executing device. The specific permission descriptions of the rights object include system constraint descriptions of a plurality of systems of the same type. The executing device obtains a corresponding system information in the device according to the system constraint descriptions and compares the system information in the device with the system information in the system constraint descriptions, so as to judge whether there is any system permitted in system constraint descriptions. If yes, it determines to permit executing the specific permission for the content object; otherwise, it determines not to permit executing said specific permission for the content object.

10 Claims, 5 Drawing Sheets

(56) References Cited

U.S. PATENT DOCUMENTS

| | | | |
|---|---|---|---|
| 2002/0184515 A1 | 12/2002 | Oho et al. | |
| 2004/0068532 A1* | 4/2004 | Dewing et al. | 709/200 |
| 2004/0158709 A1 | 8/2004 | Narin et al. | |
| 2005/0071604 A1 | 3/2005 | Tanner et al. | |
| 2005/0132209 A1* | 6/2005 | Hug et al. | 713/189 |
| 2005/0210241 A1 | 9/2005 | Lee et al. | |
| 2006/0143716 A1 | 6/2006 | Ikemoto | |
| 2006/0155651 A1 | 7/2006 | Oh et al. | |
| 2006/0158737 A1* | 7/2006 | Hu et al. | 359/566 |
| 2007/0039057 A1 | 2/2007 | Li et al. | |

FOREIGN PATENT DOCUMENTS

| | | |
|---|---|---|
| CN | 100337176 C | 9/2007 |
| EP | 1544712 A2 | 6/2005 |
| JP | 2003256596 A | 9/2003 |
| WO | WO 2008098440 A1 * | 8/2008 |

OTHER PUBLICATIONS

International search report for International application No. PCT/CN2006/001472, dated Oct. 26, 2006, 2 pages total.

English Translation of the Written Opinion of the International Search Authority for International application No. PCT/CN2006/001472, dated Oct. 26, 2006,total 3 pages.

"DRM Rights Expression Language,Candidate Version 2.0",Open Mobile Alliance, Jun. 14 2005,total 45 pages.

US office action for U.S. Appl. No. 11/504,550, dated Sep. 1, 2009, total 16 pages.

US office action for U.S. Appl. No. 11/504,550, dated Mar. 3, 2010, total 12 pages.

US office action for U.S. Appl. No. 11/504,550, dated Jun. 1, 2010, total 17 pages.

US office action for U.S. Appl. No. 11/504,550, dated Oct. 27, 2010, total 22 pages.

US office action for U.S. Appl. No. 11/504,550, dated Feb. 10, 2011, total 16 pages.

US office action for U.S. Appl. No. 11/504,550, dated Jun. 30, 2011, total 23 pages.

Open Mobile Alliance,"OMA-DRM-REL-V2_0-20040716-C",DRM Rights Expression Language V2.0,Candidate Version 2.0—Jul. 16, 2004,total 43 pages.

* cited by examiner

MAKING SYSTEM CONSTRAINTS OF A SPECIFIED PERMISSION IN DIGITAL RIGHTS MANAGEMENT

CROSS-REFERENCE TO RELATED APPLICATION

This application is a continuation of U.S. patent application Ser. No. 11/504,550, filed on Aug. 15, 2006, which claims priority to Chinese Patent Application No. 200510092506.0, filed on Aug. 15, 2005. The afore-mentioned patent applications are hereby incorporated by reference in their entireties.

BACKGROUND OF THE INVENTION

The present invention relates to digital rights management technology in the fields of computer and communications, and more particularly to a method for making system constraint of a special permission in digital rights and an apparatus for implementing the method.

With the development of the network, the contents over the network are becoming more and more richer and colorful. In order to protect digital contents, the Digital Rights Management (sometimes referred to as "DRM") has been applied more and more widely.

The system constraints of play, display, export, and execute permissions can be made in the current rights. For export permission, for example, the DRM system to which the contents are exported can be constrained, that is, the DRM contents can only be exported to other DRM systems specified in the rights. In a rights object, specific descriptions of a constrained system are commonly using a plurality of sub-elements jointly, for example, an element <version> together with an element <uid> can be used to describe a specific system. For instance, if it is desired to constraint the DRM contents to be exported only to the DRM system for XYZ 1.0, a description can be made in RO as follows:

```
<oma-dd:export oma-dd:mode="move">
  <o-ex:constraint>
    <oma-dd:system>
      <o-ex:context>
        <o-dd:version>1.0</o-dd:version>
        <o-dd:uid>XYZ</o-dd:uid>
      </o-ex:context>
    </oma-dd:system>
  </o-ex:constraint>
</oma-dd:export>
```

BRIEF SUMMARY OF THE INVENTION

In a practice application condition, multi-system constraints may need to be constrained under a specific permission in a rights object in a certain condition, such as it is needed to specify that DRM contents in a terminal can be exported to a DRM system for ABC2.0 or XYZ1.0; and in other conditions, multi-system constraints of different types may also need to be constrained, for example, it needs to be constrained in play permission; the content object can be played only in RealPlayer1.0 or MP3 2.0 in a player and symbian4.0 or symbian5.0 in an operating system. However, the prior art can only constraint a single system, and cannot satisfy such requirements.

A method for making multi-system constraint of a specific permission in a digital rights is provided, which includes the following steps:

obtaining a rights object related to a content object by an executing device, system constraint descriptions of a plurality of systems of the same type are included in specific permission descriptions of the rights object;

obtaining a corresponding system information in the executing device by the executing device according to said system constraint descriptions; and comparing the system information in the executing device with system information in said system constraint descriptions by the executing device, so as to judge whether there is a permitted system in system constraint descriptions in the executing device, and determines to permit executing said specific permission for the content object if both are the same; otherwise, determines not to permit executing said specific permission for the content object.

A multiple pairs of grammar elements for separating a specific system information are included in system constraint descriptions of said specific permission descriptions, each pair of grammar elements identifies a specific information of a system constraint, and said executing device parses the descriptions between each pair of grammar elements to obtain a specific information of each system.

According to the presently described technology, a method for making multi-system constraints of a specific permission in a digital rights is further provided, comprising the following steps:

obtaining a rights object related to a content object by an executing device, system constraint descriptions of a plurality of different types of systems are included in a specific permission description of the rights object;

obtaining the corresponding system information of each type in the executing device by the executing device according to said system constraint descriptions;

selecting a type of constrained system as a current constrained system; and comparing a corresponding type of the system information in the executing device with system information in the current constrained system, so as to judge whether there is a same system, which coincides with the current constrained system, in the executing device, and determines to permit executing said specific authority for the content object if both are the same; otherwise, determines not to permit executing said specific permission for the content object.

A multiple pairs of grammar elements for separating a system constraint descriptions are included in said specific permission descriptions, and the type of the constrained system is described in the grammar elements for separating a system constraint descriptions.

The system information of a plurality of constrained systems is included in the system constraint descriptions of at least one type of constrained system; when the executing device judges that there is a system constraint met with any one system constraint in the type of constrained system, it determines that there is a permitted system in the type of constrained system.

A multiple pairs of grammar elements for separating specific information of the system are included in the system constraint descriptions of at least one type of constrained system, each pair of grammar elements identifies a specific information of a constrained system in this type of constrained system, and said executing device parses the descriptions between each pair of grammar elements for separating a specific information of systems to obtain a specific information of each system.

The system information in said system constraint description is a software system information or a hardware system information related to the executed content object.

An implement method for making multi-system constraint of a specific permission in a digital rights management is further provided, comprising the steps of:

generating a rights object related to a rights content object;

describing system information of a plurality of systems of same type in the specific permission of the rights object;

saving the rights object and correlating it with a corresponding content object;

when downloading said content, transmitting the rights object to the executing device of the content object;

judging by the executing device whether there is a system permitted in the system constraint descriptions in the executing device; and determining whether executing the said specific rights for said content object is permitted based on the result of the judgment.

According to the presently described technology, an implement method for making multi-system constraint of a specific permission in the digital rights management is further provided, comprising the steps of:

generating a rights object related to a content object;

describing system constraint information of a plurality of systems of different types in the specific permission of the rights object;

saving the rights object and correlating the rights object with the corresponding content object;

when downloading said content object, transmitting the rights object to the executing device for receiving the content;

judging by the executing device whether there is a system permitted in the constrained system of each type in the executing device; and determining whether executing the specific permission for said content object is permitted based on the result of the judgment.

According to the presently described technology, a terminal device is provided, characterized in that said terminal device comprises:

a digital rights management agent module for processing a rights object related to a content object;

a system information collecting module for obtaining a corresponding system information in the terminal device according to system constraint descriptions of a plurality of systems of the same type in a specific permission descriptions in the rights object; and a permission authentication module for judging whether there is a system permitted in a system constraint description in the terminal device according to the system information in the terminal device and the system information in said system constraint description, and for determining whether executing said specific permission for the object content is permitted according to the result of the judgment.

According to the presently described technology, a second terminal device is further provided, characterized in that said terminal device comprises:

a digital rights management agent module for processing a rights object related to a content object;

a system information collecting module for obtaining corresponding system information in the terminal device according to system constraint descriptions of a plurality of systems of different types in specific permission descriptions in the rights object; and a permission authentication module for judging whether there is a system permitted in each type of constrained system in the system constraint descriptions in the terminal device according to the system information in the terminal device and the system information in said system constraint descriptions, and determining whether executing said specific permission for the object content is permitted according to the result of the judgment.

The system information collecting module and the permission authentication module in the terminal devices can be included in the digital rights management agent module.

A plurality of constrained systems of the same type can be described under the specific permission of the rights object according to the presently described technology. The multi-system constraint under the specific permission can be implemented by the executing device through obtaining the system information in the executing device to judge whether there is a permitted system therein.

A plurality of constrained systems of different types can also be described under the specific permission of the rights object according to the presently described technology. The multi-system constraints under the specific permission can be implemented by the executing device through obtaining the system information in the executing device to judge whether there is a permitted system in the constrained systems of each type, and a plurality of systems can also be included in the same type of the system constraint descriptions.

Thus, the presently described technology can not only be easily realized, but also have more flexibility and high reliability as compared to the conventional technology. Requirements of different application condition for constrained rights can be met by using the presently described technology.

DETAILED DESCRIPTION OF THE INVENTION

In order to make multi-system constraints for a specific permission, a plurality of constrained systems are described respectively for a specific permission of a rights object (sometimes referred to as "RO") according to the presently described technology. Information of each constrained system obtained after describing is parsed by an executing device for processing the rights object, and then is determined whether it permits a content object to be executed for a specific permission by obtaining the system information in the device. The specific permission can be play permission, display permission, or execute permission and the like. The system information in the system constraint descriptions can be software system information related to the executed content object, which is information for constraining a software system, and can also be hardware system information related to an executed content object, which is information for constraining hardware system.

On the network side, a rights issue (sometimes referred to as "RI") system can generate a rights object according to an information related to a content object. The description information of a plurality of system constraints can be included in the specific permission of the rights object. The rights object and the corresponding content object are saved and related with each other. During the process of a user's terminal device downloading the content object, the rights object can be transmitted to the user's terminal device, parsed and processed by the user's terminal device.

A plurality of constrained systems can be a plurality of constrained systems of the same type, such as a plurality of constrained systems belonging to operating systems or player systems. A plurality of constrained systems can also be a plurality of constrained system of different types (i.e. multiple kinds of constrained systems). For example, there can be constrained operating systems as well as constrained player systems. A plurality of constrained system can also be included in a certain type of a constrained system. For example, the players for RealPlayer and MP3 are constrained in a system of a type of players.

Figure 1:
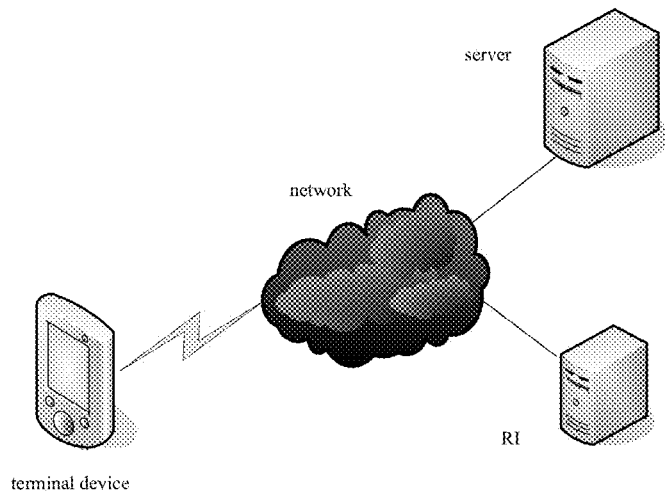
FIG. 1 is a schematic diagram of a system networking for making multi-system constraints for a specific permission in digital rights management according to an embodiment of the present invention.

Referring to FIG. 1, it shows a schematic diagram of a system networking for making multi-system constraints for a specific permission in Digital Rights Management, wherein a terminal device, a server, and a rights issue system (RI) are interconnected by the network.

Embodiment 1

This embodiment will be explained by example of a plurality of constrained systems of same type included for a specific permission of a rights object.

For multi-system constrains of the same type, a multiple pair of grammar elements for separating the specific system information are used for the specific permission in the rights object. Each pair of the grammar elements identifies a specific system information. For example, according to the number of the constrained systems, appearance numbers of the element <context> in element <system> in a rights object are expanded, so that the information of a constrained system is described in each pair of elements <context>.

Figure 2A:
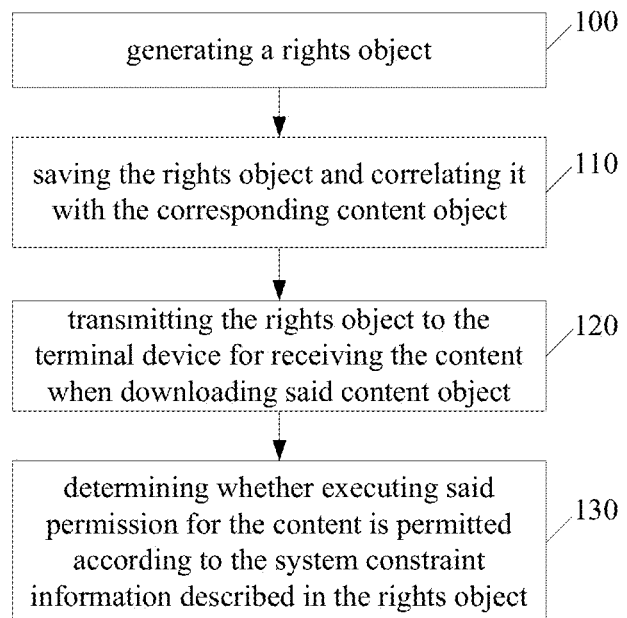
FIG. 2A is a flow chart of a method for making a constraint of a plurality of system of the same type for a specific permission on a network side according to an embodiment of the present invention.

Referring to FIG. 2A (with reference to FIG. 1), on the network side, a flow chart for implementing multi-system constraints of the same type for a specific permission in the digital rights management is shown as follows:

At step 100, a rights object related to a rights content object is generated in a rights issue system RI, and the system information of a plurality of systems of the same type, which need to be constrained, are described in a specific permission descriptions of the rights object.

At step 110, the generated rights object is saved, and is correlated with a corresponding content object.

At step 120, the rights object is transmitted to a terminal device which receives contents when the terminal device is downloading the content object.

At step 130, the terminal device that has received contents obtains a system information corresponding to the terminal device according to corresponding system information in the terminal device obtained from system constraint description information, compares the system information in the terminal device with the system information in said system constraint description information, so as to judge whether there is a system permitted in the system constraint descriptions in the terminal device, and determine whether executing said permission for said content object is permitted according to the result of the judgment.

Figure 2B:
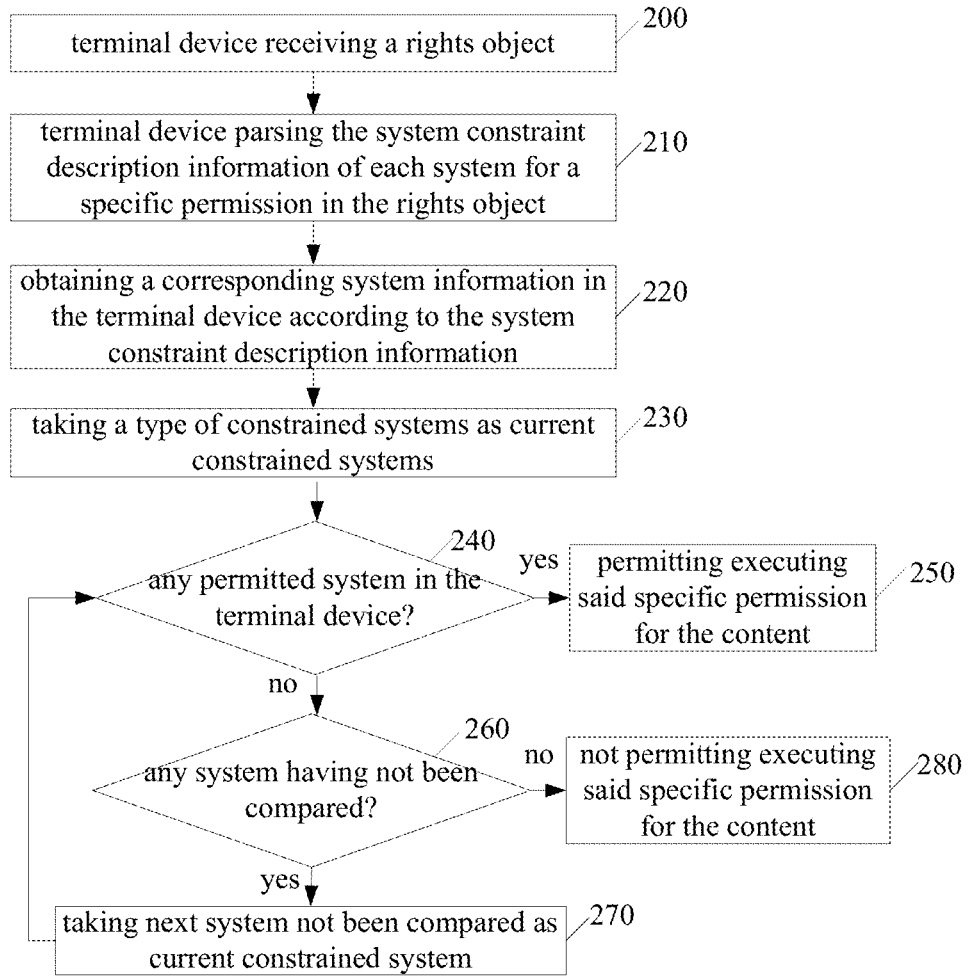
FIG. 2B is a main flow chart of a method for making a constraint of a plurality of system of the same type for a specific permission on a terminals side according to an embodiment of the present invention.

Referring to FIG. 2B, the procedure for processing multi-system constraint for a specific permission by the terminal device is as follows:

At step 200, a terminal device receives a rights object related to a content object. System constraint descriptions of a plurality of systems of the same type are included in a specific permission description of the rights object. The terminal device, which can be, for example, a mobile telephone or the like, is generally referred to as an executing device.

At step 210, the terminal device parses the system constraint descriptions information of each constrained system for a specific permission in the rights object.

At step 220, the terminal device obtains a corresponding system information in the terminal device according to the system constraint description information.

At step 230, a first constrained system for the specific permission is selected as the current constrained system.

At step 240, the terminal device compares the system information in the terminal device with the system information in the current constrained system, so as to judge whether there is a system coincided with requirements of the current constrained system. If yes, process enters into step 250, i.e., there is a permitted system the same as the current constrained system in the terminal device; otherwise, process enters into step 260.

At step 250, the terminal device determines to permit executing said specific permission for the content object, and the judging procedure is ended.

At step 260, it is to judge whether there is a constrained system not been compared with, if yes, the process enters into step 270, otherwise it enters into Step 280.

At step 270, a next constrained system not been compared with is selected as the current constrained system, and the process returns to step 240.

At step 280, the terminal device determines not to permit executing said specific permission for the content object, and the judging procedure is ended.

Taking the case in which DRM contents in a specified terminal device can be exported to the DRM system for ABC2.0 or XYZ1.0 as an example, expanding appearance numbers of the element <context> in element <system> in the rights is used to describe multi-system constrain, the description can be made as follows:

```
<oma-dd:export oma-dd:mode="move">    // an executing permission
  <o-ex:constraint>
    <oma-dd:system>
      <o-ex:context>
        <o-dd:version>1.0</o-dd:version>
        <o-dd:uid>XYZ</o-dd:uid>
      </o-ex:context>
      <o-ex:context>
        <o-dd:version>2.0</o-dd:version>
        <o-dd:uid>ABC</o-dd:uid>
      </o-ex:context>
    </oma-dd:system>
```

```
</o-ex:constraint>
</oma-dd:export>
```

For a terminal device of which the DRM system is OMA DRM 2.0 and a terminal device of which the DRM system is ABC 2.0, the terminal device of OMA DRM 2.0 learns firstly that it is a permission for exporting a content when processing the segment of description, then learns from a system constraint description any one of DRM systems wherein a rights content is only permitted to be exported to XYZ1.0 and ABC 2.0. The terminal device confirms that a DRM system in a device of an opposite end is ABC 2.0 when the terminal device is ready to export the rights content; and then determines that the DRM system is a constrained system permitted in the rights object, thus determines to permit to execute the export.

For a terminal device of which the DRM system is OMA DRM 2.0 and a terminal device of which the DRM system is DEF 2.0, the terminal device of OMA DRM 2.0 learns firstly that it is a permission for exporting a content when processing this segment of description; then learns from the system constraint description any one of the DRM systems wherein the rights content is only permitted to be exported to XYZ1.0 and ABC 2.0. Then the terminal device makes sure that a DRM system in a device of an opposite end is DEF 2.0 when the terminal device is ready to export the content; and determines that there is no constrained system permitted in the rights object in the opposite terminal device, thus determines not to permit for executing the exporting.

Figure 3:
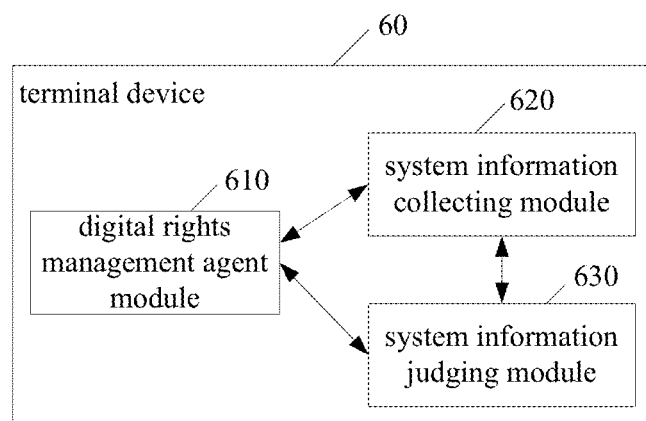
FIG. 3 is the schematic diagram of a structure of a terminal device for implementing a plurality of system constraint of the same type under a specific permission according to an embodiment of the present invention.

Referring to FIG. 3, a terminal device 60 for implementing said multi-system constraints of the same type for a specific permission includes: a digital rights management agent module 610, a system information collecting module 620, and a system information judging module 630. The system information collecting module 620, the system information judging module 630 and the digital rights management agent module 610 can have a logical connection relation with each other. Preferably, the system information collecting module 620 and the system information judging module 630 are included in the digital rights management agent module 610.

The digital rights management agent module 610 is used to process parsing the rights object related to the content, and makes the terminals use the content according to the corresponding permission specified in the rights.

The system information collecting module 620 obtains the corresponding system information in terminal device 60 according to multi-system constraint description of the specific permission descriptions in the rights object.

The system information judging module 630 compares the system information obtained by the system information collecting module 620 with the system information in multi-system constraint description, so as to judge whether there is any one constrained system permitted in the system constraint description in the terminal device 60, and determines whether the specific permission is executed for the object content according to the result of the judgment. The digital rights management agent module 610 is informed to execute the specific rights for the content object if the result of the judgment is that there is a system permitted in system constraint description; otherwise the digital rights management agent module 610 informed to give up executing the specific permission for the content object.

Embodiment 2

The embodiment is explained by an example wherein a plurality of constrained systems of different types are included for a specific permission of a rights object and information collecting constrained systems of the same type may include a plurality of constrained systems.

For a plurality of constrained systems of different types, multiple pairs of grammar elements for separating the system constraint description are used in the description for the specific permission, and the type of the constrained system is described in the grammar elements for separating the system constraint description. For example, the descriptions of the type of the constrained system such as "OS", "Player", "DRMSYS", or the like, are added following the element <system>. Wherein the "OS" explains the constraint for the operating system, the "Player" explains the constraint for the player, and the "DRMSYS" explains the constraint for other DRM systems. These key words for explaining the type of the system constraint can be extended according to requirements. In addition, if the element <uid> itself can indicate the type of the constrained system, the description of the type of the constrained system will not be added following the element <system>. Thus, for systems of different type, descriptions are made for different elements <system> respectively.

Figure 4:
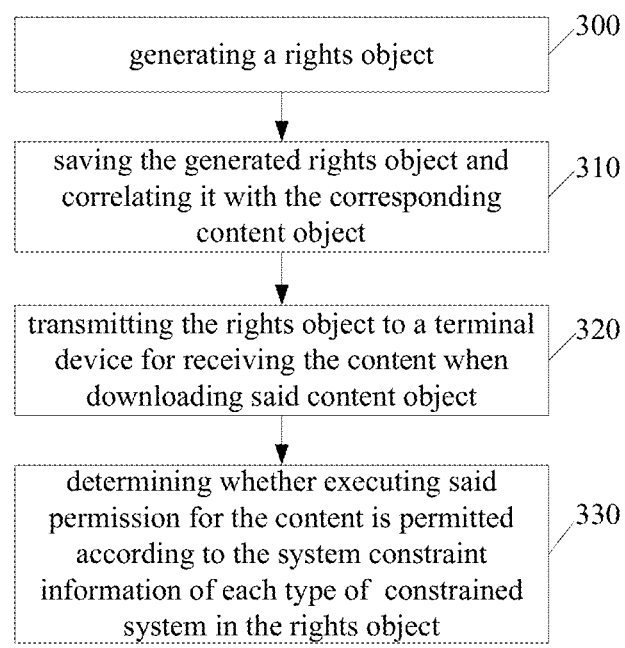
FIG. 4 is a flow chart for making a constraint of a plurality of system for a specific permission on the network side according to an embodiment of the present invention.

Referring to FIG. 4 (in conjunction with FIG. 1), procedures for implementing multi-system constraints of different types for a specific permission in the digital rights management on the network side are as follows:

At step 300, a rights object related to a content object is generated in a rights issue system, and system information of a plurality of systems of different types, which need to be constrained, are described in the specific permission descriptions of the rights object.

At step 310, the generated rights object is saved and is correlated with a corresponding content object.

At step 320, said rights object is transmitted to a terminal device for receiving contents when the terminal device is downloading the content object.

At step 330, the terminal device for receiving contents judges whether there is a system permitted in constrained systems of each type in the terminal device, and determines whether executing said specific permission for said content object is permitted according to the result of the judgment.

Figure 5A:
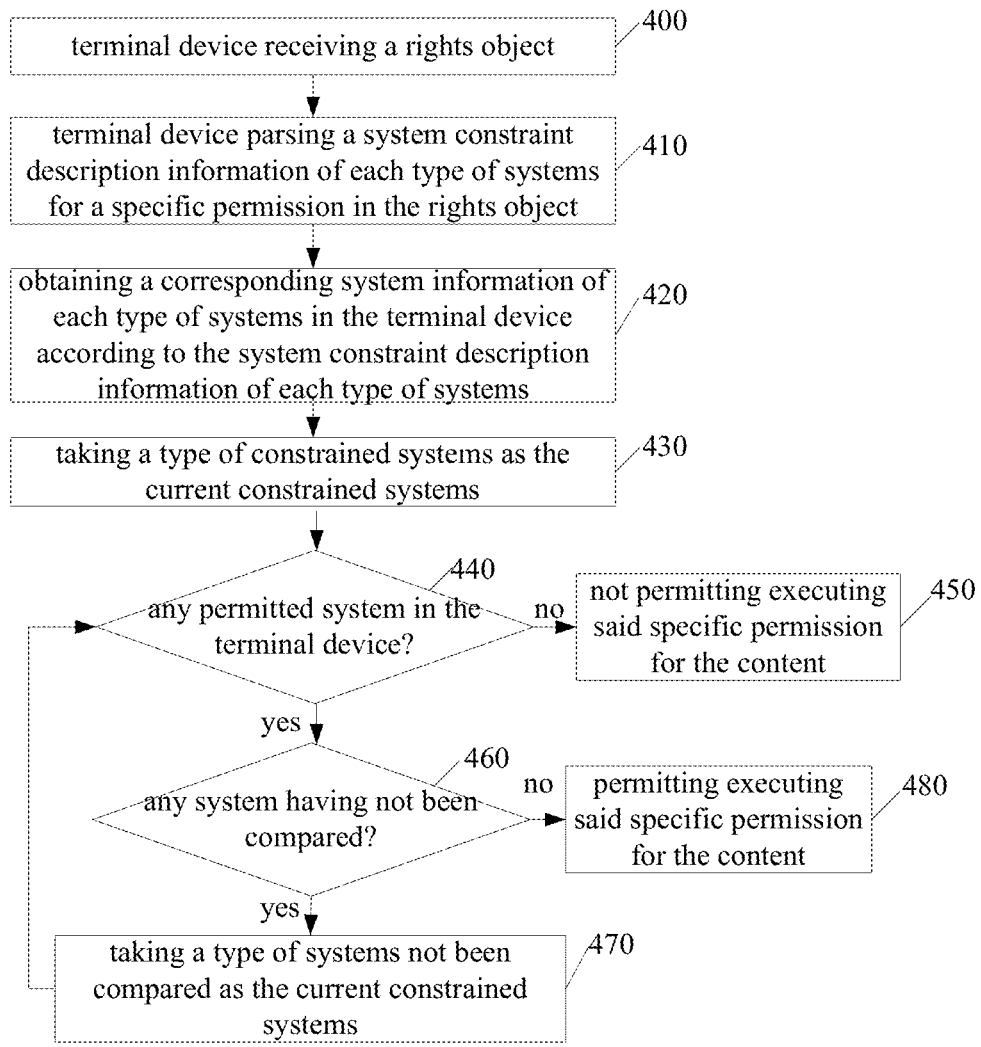
FIGS. 5A and 5B are main flow chart for making a constraint of a plurality of system of different types for a specific permission on a terminals side according to an embodiment of the present invention, respectively.

Referring to FIG. 5A, procedures for processing multi-system constraints of different types for a specific permission by the terminal device are as follows:

At step 400, the terminal device receives the rights object related to the content object, and system constraint descriptions of a plurality of systems of different types are included in the specific permission descriptions of the rights object. The terminal device, such as a mobile telephone or the like, is referred to as an executing device generally.

At step 410, the terminal device parses system constraint descriptions information of constrained systems of each type for a specific permission of the rights object.

At step 420, the corresponding system information of each type of systems is obtained from the terminal device according to system constraint description information.

At step 430, a type of constrained system is selected from a plurality of systems of different types in the specific permission as a current constrained system.

At step 440, a corresponding type of system information in the terminal device is compared with the system information in the current constrained system, so as to judge whether there is a same system as the current constrained system in the terminal device. If yes, the process enters into step 460, otherwise, the process enters into step 450.

At step 450, the terminal device determines that the requirement for executing a permission is not met, it does not permit executing said specific permission for the content object, and then ends the judging procedure.

At step 460, it is judged whether there is another constrained system not been compared with, if yes, the process enters into step 470, otherwise, the process enters into step 480.

At step 470, a type of the constrained system not been compared with is selected as a current constrained system, and then returns to step 440.

At step 480, the terminal device determines that the requirement for executing a specific permission is met and permits executing said specific permission for the content object, and ends the judging procedure.

Figure 5B:
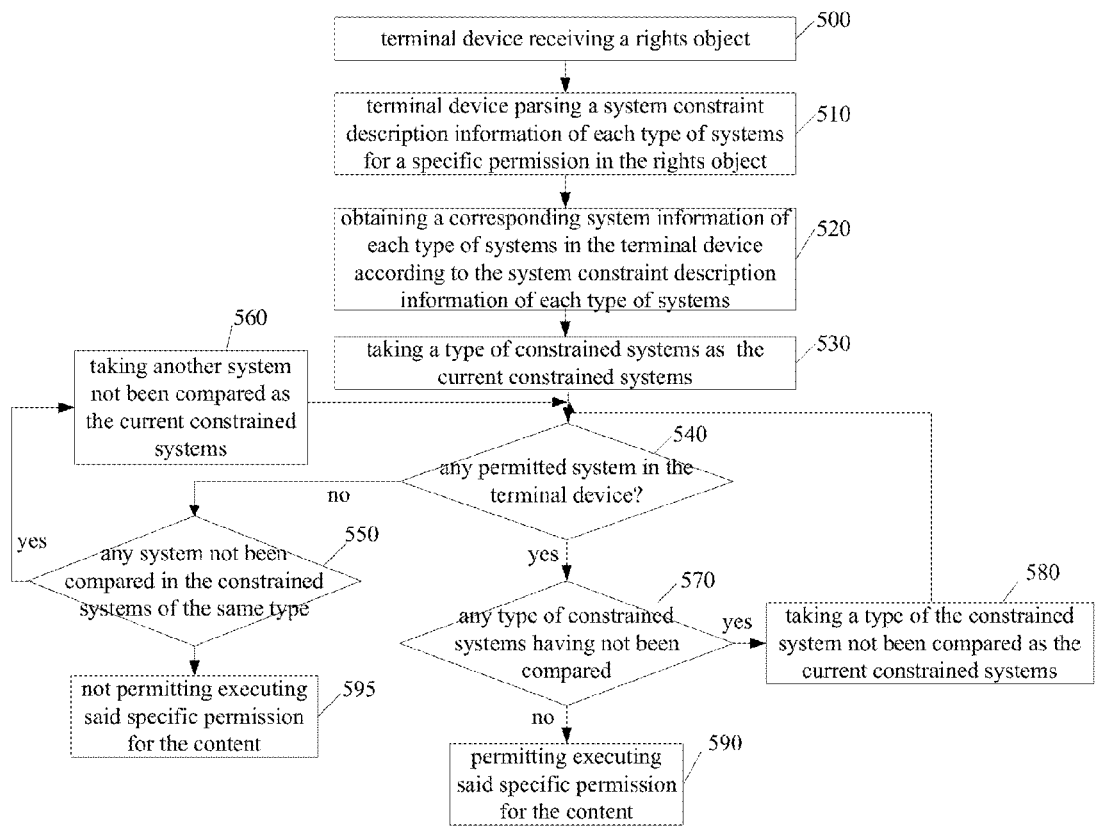

In addition, the rights object supports to constraint a plurality of system for each type of systems while it supports to constraint a plurality of system of different types for a specific permission. In this miner, the processing flow chart slightly differs from that shown in FIG. 5A. Referring to FIG. 5B, the processing chart is as follows:

At step 500, the terminal device receives the rights object related to the content object, and system constraint descriptions of a plurality of systems of different types are included in specific permission descriptions of the rights object, wherein one or more types of constrained systems include a plurality of constrained systems.

At step 510, the terminal device parses system constraint description information of each system included in each type of constrained systems for a specific permission of the rights object.

At step 520, a corresponding system information of each type of the systems is obtained from the terminal device according to a system constraint description information.

At step 530, a constrained system in a type of constrained systems is selected from a plurality of systems of different types in the specific permission as the current constrained system.

At step 540, the corresponding type of systems in the terminal device is compared with the current constrained system, so as to judge whether there is a permitted system as same as the current constrained system in the terminal device. If yes, the process enters into step 570, otherwise, the process enters into step 550.

At step 550, it is judged whether there is a constrained system not been compared with this type of the constrained systems. If yes, the process enters into step 560, otherwise, the process enters into step 595.

At step 560, another constrained system not been compared with in this type of constrained systems is taken as the current constrained system, and it is continued to execute step 540.

At step 570, it is judged whether there is a constrained system of other type not been compared with. If yes, the process enters into step 580, otherwise, the process enters into step 590.

At step 580, a constrained system in a type of constrained systems not been compared with is taken as the current constrained system, and it is continued to execute step 540.

At step 590, the terminal device determines that the requirement for executing the permission is met and permits executing said specific permission for the content object, and then the judging procedure is ended.

At step 595, the terminal device determines that the requirement for executing the permission is not met, it does not permit executing said specific permission for the content object, and then the judging procedure is ended.

The description modes for multi-system constraints in each type of systems are similar with the embodiment 1, thus two description modes can be used to describe multiple types and multi-system constraints accordingly.

For example, a permission object needs constraint for the play permission as follows: this content can only be played in a player for RealPlayer1.0, MP3 2.0 and an operating system for symbian4.0 or symbian5.0. Accordingly, the description of the specific segment RO can be made by two modes:

A first mode:

```
<o-ex:permission>
  <o-dd:play>
    <o-ex:constraint>
      <oma-dd:system type="PLAYER">
        <o-ex:context>
          <o-dd:version>1.0</o-dd:version>
          <o-dd:uid>realplayer</o-dd:uid>
        </o-ex:context>
        <o-ex:context>
          <o-dd:version>2.0</o-dd:version>
          <o-dd:uid>mp3</o-dd:uid>
        </o-ex:context>
      </oma-dd:system>
      <oma-dd:system type="OS">
        <o-ex:context>
          <o-dd:version>4.0</o-dd:version>
          <o-dd:uid>symbian</o-dd:uid>
        </o-ex:context>
        <o-ex:context>
          <o-dd:version>5.0</o-dd:version>
          <o-dd:uid>symbian</o-dd:uid>
        </o-ex:context>
      </oma-dd:system>
    </o-ex:constraint>
  </o-dd:play>
</o-ex:permission>
```

For a terminal device having a operating system symbian5.0 and a player MP3 2.0, it is learned firstly that this is a permission for playing a content when it is processing the segment description; learned from a system constraint description that a corresponding content object is permitted to be played only in the player RealPlayer1.0 or MP3 2.0 and the operating system symbian4.0 or symbian5.0; and then it is obtained that the player of the terminal device is MP3 2.0 and the operating system is sysbian5.0 by calling functions; it takes the RealPlayer1.0 in the player type as the current constrained system, and compares it with player MP3 2.0 of the terminal device. If it is found they are different, the next system of player MP3 2.0 in the player type is taken as the current system, and compared it with the player MP3 2.0 in the terminal device. If it is found they are the same, comparison for the next type of system is performed, and the constrained system symbian4.0 in the operating system type is taken as the current constrained system, and compares it with the operating system symbian5.0 of the terminal device. If it is found they are different, the next constrained operating system sysbian5.0 is taken as the current system to be compared. If it is found they are the same and all types of the constrained systems have been compared, it finally determines that the requirement for executing the play permission is met, and playing the content object is permitted.

In the segment of said rights object, the type of the constrained system can be indicated by "type=XXX" or by "mode=XXX", and can also be indicated by other key words.

A second mode:

The type of the constrained system can be expressed implicitly by using element <uid> instead of adding a description evidently in a element <system>.

```
<o-ex:permission>
  <o-dd:play>
    <o-ex:constraint>
      <oma-dd:system >
        <o-ex:context>
           <o-dd:version>1.0</o-dd:version>
           <o-dd:uid>player/realplayer</o-dd:uid>
         </o-ex:context>
         <o-ex:context>
            <o-dd:version>2.0</o-dd:version>
            <o-dd:uid>player/mp3</o-dd:uid>
         </o-ex:context>
       </oma-dd:system>
       <oma-dd:system >
         <o-ex:context>
            <o-dd:version>4.0</o-dd:version>
            <o-dd:uid>OS/symbian</o-dd:uid>
          </o-ex:context>
          <o-ex:context>
             <o-dd:version>5.0</o-dd:version>
             <o-dd:uid>OS/symbian</o-dd:uid>
          </o-ex:context>
        </oma-dd:system>
     </o-ex:constraint>
   </o-dd:play>
</o-ex:permission>
```

For a terminal device having an operating system symbian5.0 and a player MP3 1.0, it is learned firstly that this is a permission for playing a content when this segment description is processed; learned from a system constraint description that a corresponding content object is permitted to be played only in the player RealPlayer1.0 or MP3 2.0 and the operating system symbian4.0 or symbian5.0; and then it is obtained that the player in the terminal device is MP3 1.0 and the operating system is sysbian5.0; the RealPlayer1.0 in the player type is taken as the current constrained system, and compares it with player MP3 1.0 of the terminal device. If it is found they are different, next player MP3 2.0 is taken as the current system, and compares it with the player MP3 1.0 in the terminal device. If it is found they are different, and the constrained systems in the player type have been compared, it is determined that the requirement for executing the play permission is not met and successive comparisons will not be made anymore.

Figure 6:
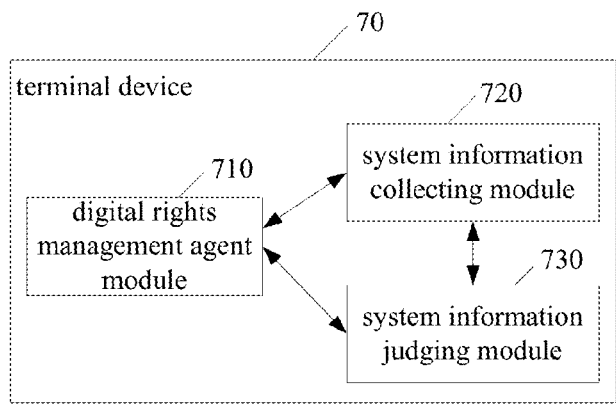
FIG. 6 is a schematic diagram of the structure of a terminal device for implementing a plurality of system constraint of different types for a specific permission according to an embodiment of the present invention.

Referring to FIG. 6, a terminal device 70 for implementing multi-system constraints of different types for a specific permission includes: a digital rights management agent module 710, a system information collecting module 720, and a system information judging module 730. The system information collecting module 720, the system information judging module 730 and the digital rights management agent module 710 have a logical connection relation with each other. Preferably, the system information collecting module 720 and the system information judging module 730 are included in the digital rights management agent module 710.

The digital rights management agent module 710 is used to processing parsing of the rights object related to the content, and making the terminals use the content according to the corresponding permission specified in the rights.

The system information collecting module 720 obtains a corresponding system information in terminal device 70 according to the system constraint descriptions of a plurality of systems of different types in the specific permission descriptions in the rights object.

The system information judging module 730 compares the system information obtained by the system information collecting module 720 with a constrained system of a corresponding type, so as to judge whether there is a permitted system in each type of the constrained systems in the terminal device 70, and determines whether this specific permission is executed for the object content according to the result of the judgment. If the result of the judgment is that there is a permitted system in a system constraint description, the digital rights management agent module 710 is informed to execute the specific permission for the content object; otherwise, to give up executing the specific permission for the content object.

In the processing procedure described in embodiments 1 and 2, the order of the comparisons of the system information in the terminal device with that of the constrained systems and how to make comparisons will not affect the implementation of the presently described technology. An person of ordinary skill in the art can implement various methods of the comparisons based on the above description.

It is understood that variant modifications and variations can be made by a person skilled in the art without departure from the spirit and scope of the presently described technology. Thus, provided that these modifications and variations falls into the scope of the claims of the presently described technology and its equivalent, it is intended to cover all these modifications and variation.

We claim:

1. In an executing device capable of consuming a content object, which is protected by a digital rights management system, a method for making multi-system constraints of a specific permission of a rights object corresponding to the content object, the method comprising:

obtaining a rights object related to the content object protected by the digital rights management system, wherein descriptions of a specific permission of the rights object includes system constraint descriptions of a plurality of systems of the same type that apply to a plurality of devices capable of consuming the content object;

obtaining corresponding system information within the executing device according to said system constraint descriptions, wherein the system information includes a type of system within the executing device;

comparing the type of system within the executing device with the system constraint descriptions of the plurality of systems of the same type for determining if a match exists between the type of system within the executing device and one or more of the plurality of systems of the same type; and based on the aforementioned comparing, determining to permit executing said specific permission for the content object if there is a match between the type of system within the executing device and one or more of the plurality of systems of the same type in said system constraint descriptions, otherwise, determining not to permit executing said specific permission for the content object.

2. The method according to claim 1, wherein multiple pairs of grammar elements for separating specific system information are included in said system constraint descriptions of said specific permission descriptions, and wherein each pair of grammar elements identifies a specific information of a system constraint description for each of the plurality of systems of the same type, the method further comprising:

parsing by said executing device the system constraint descriptions between each pair of grammar elements to obtain the specific information for each of the plurality of systems of the same type.

3. The method according to claim 1, wherein the system information in said system constraint description is software system information or hardware system information related to the executed content object.

4. The method of claim 1, wherein the specific permission of the rights object is a play permission or a display permission, and wherein the system constraint descriptions of a plurality of systems of the same type are target systems to which the content object is capable of being rendered on the plurality of devices.

5. The method of claim 1, wherein the specific permission of the rights object is an export permission, and wherein the system constraint descriptions of a plurality of systems of the same type are target systems to which the content object and rights object can be exported to the plurality of devices.

6. A computer program product for use in an executing device capable of consuming a content object, which is protected by a digital rights management system and used for making multi-system constraints of a specific permission of a rights object corresponding to the content object, the computer program product including computer executable instructions stored on a non-transitory computer readable medium such that when executed by a processor of the executing device cause it to:

obtain a rights object related to the content object protected by the digital rights management system, wherein descriptions of a specific permission of the rights object includes system constraint descriptions of a plurality of systems of the same type that apply to a plurality of devices capable of consuming the content object;

obtain corresponding system information within the executing device according to said system constraint descriptions, wherein the system information includes a type of system within the executing device;

compare the type of system within the executing device with the system constraint descriptions of the plurality of systems of the same type for determining if a match exists between the type of system within the executing device and one or more of the plurality of systems of the same type; and based on the aforementioned comparing, determine to permit executing said specific permission for the content object if there is a match between the type of system within the executing device and one or more of the plurality of systems of the same type in said system constraint descriptions, otherwise, determining not to permit executing said specific permission for the content object.

7. The computer program product according to claim 6, wherein multiple pairs of grammar elements for separating specific system information are included in said system constraint descriptions of said specific permission descriptions, and wherein each pair of grammar elements identifies a specific information of a system constraint description for each of the plurality of systems of the same type, the computer executable instructions further causing the execution device to:

parse the system constraint descriptions between each pair of grammar elements to obtain the specific information for each of the plurality of systems of the same type.

8. The method according to claim 1, wherein the system information in said system constraint description is software system information or hardware system information related to the executed content object.

9. The method of claim 1, wherein the specific permission of the rights object is a play permission or a display permission, and wherein the system constraint descriptions of a plurality of systems of the same type are target systems to which the content object is capable of being rendered on the plurality of devices.

10. The method of claim 1, wherein the specific permission of the rights object is an export permission, and wherein the system constraint descriptions of a plurality of systems of the same type are target systems to which the content object and rights object can be exported to the plurality of devices.

* * * * *